United States Patent [19]

Gotoh et al.

[11] 4,117,199

[45] Sep. 26, 1978

[54] PROCESS FOR PRODUCING MOISTURE AND WATER-PROOF PAPER

[75] Inventors: Hideo Gotoh; Akira Igarashi, both of Tokyo; Reiko Kobayashi; Kiyotake Akiho, both of Ichikawa, all of Japan

[73] Assignee: Oji Paper Co., Ltd., Tokyo, Japan

[21] Appl. No.: 836,708

[22] Filed: Sep. 26, 1977

[30] Foreign Application Priority Data

Sep. 27, 1976 [JP] Japan ................. 51-115677

[51] Int. Cl.$^2$ .............. C08H 9/08; C08D 13/16; C08F 45/52; D21H 1/28
[52] U.S. Cl. ............... 428/486; 260/28.5 B; 427/209; 427/391; 428/514
[58] Field of Search .............. 260/28.5 AV, 28.5 B; 427/391, 209; 428/486, 514

[56] References Cited

U.S. PATENT DOCUMENTS

| | | | |
|---|---|---|---|
| 2,756,217 | 7/1956 | Young et al. | 260/28.5 B |
| 2,817,640 | 12/1957 | Templin | 260/28.5 X |
| 3,281,267 | 10/1966 | Rice | 260/28.5 X |
| 3,644,130 | 2/1972 | Evans et al. | 260/28.5 X |
| 3,772,234 | 11/1977 | Porter | 428/486 X |
| 3,791,856 | 2/1974 | Duling et al. | 427/359 |

*Primary Examiner*—Michael R. Lusignan
*Attorney, Agent, or Firm*—David T. Nikaido; James E. Armstrong; Charles M. Marmelstein

[57] ABSTRACT

A coated paper having a moisture and water-proof coating thereon is produced by coating a paper substrate with an aqueous emulsion containing a synthetic rubber latex and a wax emulsion in an amount of the solid wax of 5 to 200 parts by weight per 100 parts by weight of the solid synthetic rubber and, then, drying the coated paper at a temperature the same as or higher than the melting point of the wax. The resultant paper is highly capable of repulping.

15 Claims, No Drawings

PROCESS FOR PRODUCING MOISTURE AND WATER-PROOF PAPER

The present invention relates to a process for producing a moisture and water-proof repulpable paper. More particularly, the present invention relates to a process for producing a repulpable paper having a highly moisture and water-proof coating formed on a surface of a paper substrate.

It is well known that a water-proof paper can be produced by impregnating or coating a paper substrate with a wax melt, solution or emulsion. However, it is also well known that the above-mentioned type of waxed paper has a relatively poor moisture proofing property and is difficult to repulp. Further, it is frequently found that when the waxed paper is fold, the creased portion of the paper has a poor water-proofing property.

An attempt has been made in the past by the inventors of the present invention to eliminate the above mentioned drawbacks of waxed paper. That is, Japanese Patent Application Laying-open No. 50-36711 (1975) discloses a process for producing a moisture and water-proof paper. In this process, a paper substrate is coated with an aqueous emulsion which has been prepared by:

(A) admixing small amounts of rosin and at least one saturated or unsaturated higher aliphatic alcohol having 8 to 18 carbon atoms into a mixture of 30 to 50% by weight of a solid paraffin wax having a melting point of from 40° to 60° C., and 50 to 70% by weight of a petroleum resin modified with maleic acid and having a softening point of from 50° to 100° C.;

(B) melting the admixture;

(C) emulsifying the admixture melt with an aqueous solution of an organic amine or ammonia, and;

(D) treating the aqueous emulsion with an alkali metal hydroxide. Thereafter, the coated paper is dried at a temperature lower than the melting point of the paraffin wax. In the above-mentioned treatment of the emulsion with the alkali metal hydroxide, the petroleum resin modified with maleic acid and the rosin is saponified.

In the aqueous emulsion mentioned above, the paraffin wax is effective for causing the paper to have a high hydrophobic and water-repellent property. The petroleum resin modified with maleic acid has a high water-proof property, and the saponified petroleum resin modified with maleic acid and the saponified rosin are effective for stabilizing the emulsion of the paraffin wax in water. However, the moisture and water-proofing property of the coated paper can be obtained only when the coating is dried at a temperature lower than the melting point of the paraffin wax. This is because the overcoating film of the paraffin wax and the modified petroleum resin can be formed on the surface of the paper substrate only when the drying temperature is lower than the melting point of the paraffin wax. If the drying of the emulsion is carried out at a temperature higher than the melting point of the paraffin wax, the melted paraffin wax will penetrate into the inside of the paper substrate and can not form the overcoating film of the paraffin wax on the paper substrate surface. The overcoating film of the paraffin wax provided on the paper substrate surface at a temperature lower than the melting point of the paraffin wax is brittle. Therefore, when the coated paper is folded, the creased portion thereof has a very poor moisture and water-proof property due to the breakage of the overcoating film at the creased portion of the coated paper.

Further, the above-mentioned coated paper has the disadvantage that the degrees of the moisture and water-proofing property of the coated paper decrease with the lapse of time about two months after the production thereof.

The water-proof paper can be obtained by coating the surface of the paper substrate with a film-forming hydrophobic synthetic resin solution or latex and drying the coated paper. Or, the water-proof paper can be produced by laminating a hydrophobic synthetic resin film on the surface of the paper substrate. The hydrophobic synthetic resin may be selected from polyethylene, polypropylene, polyvinyl chloride, polyvinylidene chloride, and copolymers of two or more of the monomers which the above-mentioned polymers are produced. The latex or solution of the hydrophobic synthetic resin may penetrate into the inside of the paper substrate or may be added into an aqueous slurry of pulp to be made into the paper.

The above-mentioned type of water-proof paper containing the hydrophobic synthetic resin has a high degree of water-proofing property and the synthetic resin is firmly fixed to the paper substrate. However, this type of water-proof paper is very difficult to repulp and reuse. That is, when the waste water-proof paper is subjected to a repulping process, it is very difficult to separate the hydrophobic synthetic resin from the paper substrate. Even if the synthetic resin is separated from the paper substrate, the resultant pulp recovered from the paper substrate will be contaminated with a number of strips of the synthetic resin film and will be useless.

In another process for producing water-proof paper, the paper is produced from an aqueous slurry of pulp containing a wax emulsion, a sizing agent, aluminum sulfate and a thermo-setting resin or wet strength resin (an agent for improving the wet tensile strength of paper). However, the resultant paper has relatively poor moisture and water-proof properties, and is difficult to repulp and reuse.

The moisture and water-proof paper is usually used as wrapping paper or packaging paper and after being used, the paper is normally burnt or thrown away. However, from the points of view of the economy of wood resource and the prevention of environmental pollution due to the combustion and throwing away of the waste paper, it is important that the capability exist to be able to repulp and reuse the waste paper for making paper.

An object of the present invention is to provide a process for producing a moisture and water-proof repulpable paper which does not allow moisture and water to permeate therethrough.

Another object of the present invention is to provide a process for producing a moisture and water-proof paper which is capable of being easily repulped after using.

Still another object of the present invention is to provide a process for producing a moisture and water-proof paper which has a high durability of the moisture and water-proof property over a long period of time.

A further object of the present invention is to provide a process for producing a moisture and water-proof paper having, when the paper is creased, a high resistance to any decrease in the moisture and water-proofing property of the creased portion of the paper.

The above-mentioned objects can be attained by utilizing the process of the present invention, which comprises coating at least one surface of a paper substrate with an aqueous emulsion containing a synthetic rubber latex and a wax emulsion in an amount of the solid wax of 5 to 200 parts by weight per 100 parts by weight of the solid synthetic rubber, and, then, drying said coated paper at an elevated temperature the same as or higher than the melting point of said wax.

The synthetic rubber usable for the present invention may be selected from copolymers of butadiene with at least one ethylenically unsaturated monomer. It is preferable that the amount of the butadiene in the synthetic rubber be in a range of from 25 to 75% by weight.

The ethylenically unsaturated monomer may be selected from methylmethacrylate, styrene and acrylonitrile. The synthetic rubber may contain at least one ethylenically unsaturated carboxylic acid copolymerized with the butadiene and the ethylenically unsaturated monomer mentioned above. The ethylenically unsaturated carboxylic acid is selected from acrylic acid, methacrylic acid, crotonic acid and maleic acid, and used for modifying the copolymers of butadiene and the above-mentioned ethylenically unsaturated monomer.

The above-mentioned copolymers and modified copolymers have a good film-forming property, and can be easily separated from the cellulosic fibers in the paper substrate by mechanical beating action. A most preferable synthetic rubber for the present invention is a methylmethacrylate-butadiene rubber comprising 60 to 75% by weight of methylmethacrylate and the balance consisting of butadiene. The synthetic rubber latex can be prepared by copolymerizing butadiene, the ethylenically unsaturated monomer, for example, acrylonitrile, methylmethacrylate or styrene, and, optionally, the ethylenically unsaturated carboxylic acid, for example, acrylic acid or methacrylic acid by using an emulsion polymerization process.

The wax emulsion usable for the present invention may contain at least one wax selected from paraffin waxes and polyolefin waxes, for example, polyethylene waxes and polypropylene waxes. The wax preferably has a melting point of from 40 to 100, more preferably, from 50° to 70° C. The wax emulsion can contain one or more additive, for example, water repellent zirconium compounds, silicon compounds, higher fatty acids, higher fatty alcohols, higher fatty acid esters, higher fatty alcohol ethers and petroleum resins.

The wax emulsion usable for the present invention may be an emulsion disclosed in Japanese Patent Application Laying-open No. 50-36711(1975) which has been prepared in such a manner that a mixture of 30 to 50% by weight of a solid paraffin wax, having a melting point of from 40° to 60° C., and 50 to 70% by weight of a petroleum resin, modified with maleic acid and having a softening point of from 50° to 100° C., is admixed with small amounts of rosin and at least one saturated or unsaturated higher aliphatic alcohol having 8 to 18 carbon atoms; the admixture is uniformly melted; an aqueous solution of an organic amine or ammonia is emulsified in the melt, and; the emulsion is treated with an aqueous solution of an alkali metal hydroxide.

In the above-mentioned emulsion, the organic amine may be selected from monoethanolamine, diethanolamine, triethanolamine and morpholine. The aqueous solution of the organic amine or ammonia may contain 5 to 10% of the organic amine or ammonia. The organic amine and ammonia may be used in an amount of from 0.5 to 2% based on the weight of the melt to be emulsified.

The higher aliphatic alcohol usable for the above-mentioned emulsion may be selected from 2-ethylhexyl alcohol, octyl alcohol, decyl alcohol, dodecyl alcohol, mylistyl alcohol, stearyl alcohol and oleic alcohol. The rosin and the higher aliphatic alcohol are preferably used in an amount of from 3 to 7%, more preferably, about 5%, based on the sum of the weights of the paraffin wax and the modified petroleum resin, respectively.

In the treatment of the emulsion, the alkali metal hydroxide, for example, sodium hydroxide or potassium hydroxide, is used in an amount of from 3 to 6% based on the weight of the melt to be emulsified. The alkali metal hydroxide is effective for saponifying at least a part of the modified petroleum resin and the rosin. The saponified modified petroleum resin and rosin are effective for stabilizing the aqueous emulsion of the paraffin wax and the non-saponified petroleum resin. The higher aliphatic alcohol is also effective for stabilizing the aqueous emulsion.

The emulsification of the amine or ammonia solution in the melt is carried out at a temperature of from 100° to 110° C., and the alkali treatment of the emulsion is carried out at a temperature of from 95° to 100° C. During the alkali treatment at a pH of about 9, the emulsion of the amine or ammonia aqueous solution in the melt is converted to an emulsion of the melt in the amine or ammonia solution. The emulsion may contain a non-ionic surface active agent, for example, an addition product of nonyl phenol and ethylene oxide, as an emulsifying agent.

When the wax emulsion is diluted with water so as to provide a total solid concentration of from 25 to 35%, preferably, about 30%, the emulsion particles in water have a size of from about 0.1 to 2 microns.

The paper substrate usable for the present invention is not limited to a specific kind of paper. However, preferable paper substrates can be selected from kraft paper, fine paper, machine glazed paper and corrugated paper. It is preferable that the paper substrate has a weight of from 40 to 200 g/m$^2$.

In order to prepare the aqueous emulsion usable for the present invention, the synthetic rubber latex is mixed with the wax emulsion in an amount of the solid wax of 5 to 200 parts by weight per 100 parts by weight of the solid synthetic resin. When the amount of the solid wax is less than 5 parts by weight per 100 parts by weight of the solid synthetic rubber, the resultant moisture and water-proof paper will be difficult to repulp, because the synthetic rubber is firmly fixed to the paper substrate to an excessive extent. If the amount of the solid wax is more than 200 parts by weight per 100 parts by weight of the solid synthetic rubber, the resultant moisture and water-proof coating is excessively brittle and is weakly fixed to the paper substrate. Accordingly, when this type of coated paper is folded or bent, the creased portion of the paper has a very poor moisture and water-proofing property.

The aqueous emulsion preferably has a total solid concentration of from 200 to 600 g/l and a viscosity of from 10 to 200 cps. The emulsion is applied in an amount of from 1.7 to 150 cc/m$^2$ onto a surface of the paper substrate, so that 1 to 30 g/m$^2$ of the solid moisture and water-proof coating is formed on the surface.

When the amount of the coating is less than 1 g/m$^2$, the resultant coated paper will have a poor moisture and water-proofing effect, due to the formation of pin holes in the coating layer and formation of fiber fluffs extending from the paper substrate onto the coating surface through the coating layer. If the amount of the coating is more than 30 g/m², the resultant coated paper has a poor capability of being repulped. Even if the coating layer can be separated from the paper substrate, the resultant repulped product is contaminated with to much of the coating layer strips.

The coated paper is, then, dried at an elevated temperature the same as or higher than the melting point of the wax in the emulsion, preferably, 70° to 120° C. The drying temperature is preferably lower than the melting point of the synthetic rubber in the emulsion.

If the drying temperature is lower than the melting point of the wax, the resultant coated paper will have a poor moisture-proofing property. The drying temperature higher than the melting point of the wax results in a high moisture and water-proofing property of the resultant coated paper, and in a quick drying process.

In an electron microscopic view of the moisture and water-proof paper of the present invention, it was observed that a layer of the synthetic rubber is formed on the surface of the paper substrate, a major portion of the wax forms an overcoating covering the surface of the synthetic rubber layer, another small portion of the wax is uniformly distributed in the inside of the synthetic rubber layer, and the remaining portion of the wax penetrates into the intersurface portion between the paper substrate and the synthetic rubber layer, and fills the spaces between fibers in the inter surface portion of the paper substrate.

The above-mentioned special distribution of the wax in the coated paper of the present invention results in an unexpected high degree and durability of the moisture and water-proofing property, and an unanticipated high repulpability of the coated paper of the present invention. That is, as a result of cooperation of the paraffin wax with the synthetic rubber latex, the resultant coating on the paper substrate surface has an excellent moisture and water-proof property whereas the amount of the coating is relatively small. Also, the resultant coating can be easily separated from the paper substrate by applying thereto a beating process, so as to easily repulp the paper substrate.

Further, it is an unexpected effect of the present invention that in the repulping process, the strips of the coating films separated from the paper substrate are divided into very fine particles and the particles are dispersed in the repulping medium to form a pulp slurry. The dispersed particles of the moisture and water-proofing materials do not form flocks in the pulp slurry. Therefore, the resultant pulp can easily be separated from the dispersion of the moisture and water-proofing materials.

The specific examples, shown below will serve to more fully explain the practice of the process of the present invention. However, it should be understood that the examples are only illustrative and should in no way limit the scope of the present invention.

In the examples, water vapor permeability (water vapor transmission rate), degree of defiberizing, and degree of water resistance were respectively determined in accordance with the following methods.

1. Water vapor permeability

The water vapor permeability was determined in accordance with a dish method of TAPPI Standard T 464.

2. Degree of defiberizing property 2000 ml cylindrical vessel with a stirrer was charged with 500 ml of water and 8 g of strips of paper to be tested, each strip having a size of about 2 cm². The stirrer was operated until the paper strips were completely defiberized. The degree of defiberizing property is indicated by the time in seconds consumed for completely defiberizing the paper strips.

3. Degree of water resistance

A box-shaped vessel having a length of 7.0 cm, a width of 9.0 cm and a depth of 3.5 cm was prepared from a moisture and water-proof paper in such a manner that the moisture and water-proof coating surface of the paper formed the inside wall surface of the box-shaped vessel. 100 ml of an aqueous solution of 0.5 g/l of Methylene Blue were charged into the vessel and kept for 17 hours. Thereafter, the aqueous solution was removed from the vessel and the depth of color on the inside wall surface of the vessel was observed. Also observed was whether or not the aqueous solution penetrated through the paper to the outside wall surface of the vessel.

The degree of water resistance is indicated in accordance with the following classification.

| Class | Condition of inside wall surface of vessel |
|---|---|
| 1 | remarkably stained |
| 2 | stained |
| 3 | slightly stained |
| 4 | negligibly stained |
| 5 | not stained |

EXAMPLES 1 THROUGH 7 AND

Comparison Examples 1 through 6

In Example 1, 100 parts by weight of a latex (1) containing 48% by weight of a copolymer of 65% by weight of methylmethacrylate with 35% by weight of butadiene were mixed with 28 parts by weight of a wax aqueous emulsion (1) containing 66% by weight of polyethylene wax having a melting point of 68° to 74° C., in order to prepare a coating liquid. The coating liquid was applied onto a surface of a piece of machine glazed unbleached kraft paper having a weight of 50 g/m² by using a Mayer rod (wire-wound doctor). The coated paper was dried at a temperature of 105° C. for one minute. A moisture and water-proof paper was obtained having 5.1 g/m² of a moisture and water-proof coating layer.

In Examples 2 through 7, a wax emulsion (2) was prepared by the following process. 1131.3 g of paraffin wax having a melting point of 60° C. were mixed with 1552.7 g of petroleum resin modified with maleic acid in an amount of 5% based on the weight of the petroleum resin and having a melting point of from 75° to 78° C.; 141.2 g of rosin and 96.1 g of an alcohol mixture of cetyl alcohol and octadecyl alcohol in a mixing ratio by weight of 1:1. The mixture was charged into an emulsifying vessel and melted at a temperature of 90° C. 281 ml of an aqueous solution containing 28.1 g of diethanolamine were added dropwise to the melt at a temperature of 110° C. while stirring the melt. After the addition was completed, the mixture was cooled to a temperature of 95° C. 119.6 g of a 48% potassium hydroxide aqueous solution were added dropwise to the mixture while stirring the mixture. Thereafter, the mixture was stirred for 15 minutes at a temperature of 95° C. The mixture was cooled to a temperature of 80° C. The resultant W/O type emulsion was diluted with hot water having a temperature of 70° to 80° C. until the total solid concentration of the diluted emulsion became 50%. During the diluting operation, the W/O type emulsion was converted into an O/W type emulsion. An aqueous solution containing 48.1 g of a non-ionic surface active agent comprising an addition product of nonylphenol with ethylene oxide was added to the emulsion and, then, the emulsion was diluted with hot water so that the total solid concentration of the diluted emulsion became 40%. The emulsion was cooled to a temperature of 50° C., and diluted with water so that the total solid concentration of the diluted emulsion became 30%. 10 kg of a milky white emulsion having a pH of 10.9 were obtained.

In each of Examples 2 and 3, a portion of the above-prepared wax emulsion and the same methylmethacrylatebutadiene rubber latex (1) as used in Example 1 were mixed in amounts as indicated in Table 1 to prepare a coating liquid. The coating liquid was applied to the same type paper and by using the same method as those used in Example 1.

In each of Examples 4 through 7, a portion of the above-prepared wax emulsion in an amount indicated in Table 1 was mixed with a latex (2) containing 48% by weight of a copolymer of 70% by weight of methylmethacrylate and 30% by weight of butadiene in an amount shown in Table 1, to provide a coating liquid. This coating liquid was applied to the same type paper and by using the same method as those used in Example 1.

In Comparison Example 1, the same type paper as that used in Example 1 was coated with a latex containing 50% by weight of polyvinylidene chloride in such a manner that a coating layer in an amount of 17 g/m² was formed on the paper surface.

In Comparison Example 2, the same type paper as that used in Example 1 was coated with an aqueous emulsion of modified polyethylene having a melting point of 85° to 95° C. so as to form a coating layer in an amount of 5.0 g/m².

In Comparison Example 3, the same type paper as that used in Example 1 was coated with a hot melt type paraffin wax a melting point of 63° to 68° C. so as to form a coating layer in an amount of 9.3 g/m².

In Comparison Example 4, the same type paper as that used in Example 1 was coated with the same methylmethacrylatebutadiene rubber latex (1) as that used in Examples 1 through 3 so as to provide a coating layer in an amount of 4.0 g/m².

In Comparison Example 5, the same type paper as that used in Example 1 was coated with the same methylmethacrylatebutadiene rubber latex (2) as that used in Examples 4 through 7.

In Comparison Example 6, the same type paper as that used in Example 1 was coated with the same wax emulsion prepared in Examples 2 through 7 so as to provide a coating layer in an amount of 4.5 g/m².

The water vapor permeabilities, degrees of defiberizing property and degrees of water resistance of Examples 1 through 7 and Comparison Examples 1 through 6 are indicated in Table 1.

Table 1

| Example No. | Composition (parts by weight) | | Amount of coating (g/m²) | Water vapor permeability (g/m² 24 hr) | Degree of defiberizing property (sec) | Degree of water resistance (class) |
|---|---|---|---|---|---|---|
| Example 1 | MBR-latex (1) | 100 | 5.1 | 200 | 140 | 5 |
|  | Polyethylene wax emulsion (1) | 28 |  |  |  |  |
| 2 | MBR-latex (1) | 100 | 4.1 | 111 | 170 | 5 |
|  | Wax emulsion (2) | 25 |  |  |  |  |
| 3 | MBR-latex (1) | 100 | 3.5 | 128 | 150 | 5 |
|  | Wax emulsion (2) | 31 |  |  |  |  |
| 4 | MBR-latex (2) | 100 | 3.8 | 50 | 150 | 5 |
|  | Wax emulsion (2) | 25 |  |  |  |  |
| 5 | MBR-latex (2) | 100 | 3.9 | 45 | 150 | 5 |
|  | Wax emulsion (2) | 31 |  |  |  |  |
| 6 | MBR-latex (2) | 100 | 4.5 | 64 | 170 | 5 |
|  | Wax emulsion (2) | 63 |  |  |  |  |
| 7 | MBR-latex (2) | 100 | 4.3 | 90 | 190 | 4 |
|  | Wax emulsion (2) | 125 |  |  |  |  |
| Comparison example 1 | Polyvinyliden chloride latex |  | 17.0 | 190 | 260 | 5 |
| 2 | Aqueous emulsion of modified polyethylene |  | 5.0 | 2500 | 1800 | 4 |
| 3 | Hot melt type paraffin wax |  | 9.3 | 438 | 300 | 5 |
| 4 | MBR-latex (1) |  | 4.0 | 1900 | 190 | 5 |
| 5 | MBR-latex (2) |  | 5.0 | 2200 | 150 | 5 |
| 6 | Wax emulsion (2) |  | 4.5 | 132 | 210 | 2 |

Table 1 shows that each of the coating layers of Examples 1 through 7 had a moisture-proofing property similar (Example 1) to or higher (Examples 2 through 7) than that of the coating layer of Comparison Example 1, which was composed of polyvinylidene chloride film having a high moisture-proofing property. Also, the coated papers of Examples 1 through 7 had a higher degree of defiberizing property than that of Comparison Example 1. The coated papers of Comparison Example 4 and 5, which were coated with only a MBR-latex, had a very poor moisture-proofing property and a relatively low degree of defiberizing property. The coated paper of Comparison Example 6 had a relatively low degree of defiberizing property and a very poor water resistance. That is, the excellent moisture-proofing property and defiberizing property of the coated papers of Examples 2 through 7 can not be anticipated from the results of Comparison Examples 4 through 6. The coated papers of Comparison Examples 2 and 3 had poor moisture-proofing property and defiberizing property.

EXAMPLES 8 THROUGH 10

In Example 8, 100 parts by weight of the same latex (2) as that used in Examples 4 through 7 were mixed with 50 parts by weight of the same wax emulsion (2) as that used in Examples 2 through 7, and, then, the mixture was diluted with 7.5 parts by weight of water to provide a coating liquid. A surface of a machine glazed kraft paper having a weight of 50 g/m² was coated with the coating liquid by using a Dixon coater in accordance with an air-knife coating method at a speed of 12 m/min and, then, dried at a temperature of 90° C. for 30 seconds. The resultant coated paper had a coating layer in an amount of 6.2 g/m². The resultant coated paper was subjected to the same tests as those mentioned in Examples 1 through 7.

In Example 9, the same procedures as those mentioned in Example 8 were carried out, except that the drying operation was carried out at a temperature of 105° C.

In Example 10, the same procedures as those mentioned in Example 9 were repeated, except that before testing the water vapor permeability, the specimen of the coated paper was folded twice under a total load of 2 kg, to make a cross-shaped crease on the specimen, and the creased portion of the coated paper was subjected to the test for water vapor permeability.

The results of Examples 8 through 10 are shown in Table 2.

Table 2

| Ex. No. | Drying temp. | Amount of coating (g/m²) | Water vapor permeability (g/m²/24hr) | Degree of defiberizing property (sec) | Degree of water resistance |
|---|---|---|---|---|---|
| 8 | 90 | 6.2 | 45 | 165 | 5 |
| 9 | 105 | 5.6 | 39 | 160 | 5 |
| 10 | 105 | 5.6 | (creased portion) 65 | 160 | 5 |

In Examples 8 through 10, the coating and drying operations could be carried out without difficulty, and the resultant coated papers had excellent moisture-proofing property, defiberizing property and water resistance. Table 2 shows that in Example 10, the creased portion of the coated paper had a moisture-proofing property high enough to be sufficient for practical use of the coated paper.

For comparison purposes, a speciment of the coated paper of Comparison Example 6, having a water vapor permeability of 132 g/m²/24hr., was creased in the same manner as that of Example 10, and the creased portion of the paper was subjected to the water vapor permeability test. It was found that the creased portion had a very large water vapor permeability of 600 g/m²/24hr.

EXAMPLES 11 THROUGH 15

In Example 11, 49 parts by weight of the same MBR-latex (2) as that used in Examples 4 through 7 were mixed with 51 parts by weight of a latex (3) containing 50% by weight of a copolymer of 40% by weight of styrene, 57% by weight of butadiene and 3% by weight of oleic acid. The latex mixture was mixed with 9 parts of the same wax emulsion (2) as that used in Examples 2 through 7, to provide a coating liquid. This coating liquid was used in the same method as that mentioned in Example 1 to prepare a moisture and water-proof paper. The resultant paper was subjected to the same tests as used in Example 1.

In each of Examples 12, 13 and 14, the same procedures as those mentioned in Example 11 were carried out, except that the latexes (2) and (3) and the wax emulsion (2) were employed in amounts as shown in Table 3.

In Example 15, the same procedures as those mentioned in Example 11 were carried out, except that the coating liquid was prepared by mixing 100 parts by weight of a latex (4) containing 50% by weight of a copolymer of 35% by weight of styrene and 65% by weight of butadiene, and 13 parts by weight of the wax emulsion (1) which was used in Example 1.

The results of Examples 11 through 15 are shown in Table 3.

Table 3

| Example No. | Composition (part by weight) | | Amount of coating (g/m²) | Water vapor permeability (g/m²24hr) | Degree of defiberizing property (sec) | Degree of water resistance (class) |
|---|---|---|---|---|---|---|
| 11 | MBR-latex (2) | 49 | 5.4 | 65 | 180 | 5 |
|  | SBR-latex (3) | 51 |  |  |  |  |
|  | Wax emulsion (2) | 9 |  |  |  |  |
| 12 | MBR-latex (2) | 49 | 5.5 | 26 | 190 | 5 |
|  | SBR-latex (3) | 51 |  |  |  |  |
|  | Wax emulsion (2) | 15 |  |  |  |  |
| 13 | MBR-latex (2) | 66 | 5.4 | 52 | 170 | 5 |
|  | SBR-latex (3) | 34 |  |  |  |  |
|  | Wax emulsion (2) | 12 |  |  |  |  |
| 14 | MBR-latex (2) | 66 | 5.5 | 28 | 180 | 5 |
|  | SBR-latex (3) | 34 |  |  |  |  |
|  | Wax emulsion (2) | 21 |  |  |  |  |
| 15 | SBR-latex (4) | 100 | 5.8 | 197 | 240 | 5 |
|  | Wax emulsion (1) | 13 |  |  |  |  |

Table 3 shows that the coating papers of Examples 11 through 14 had an excellent moisture and water-proofing property and defiberizing property.

Table 3 also shows that the coating paper of Example 15 had a moisture-proofing property and defiberizing property high sufficient for practical use of the coated paper.

EXAMPLES 16 THROUGH 20

In each of Examples 16 through 20, a coating liquid was prepared by mixing the same MBR-latex (2) as that used in Examples 4 through 7 and a wax emulsion (3) containing 33% by weight of a mixture of 62% by weight of paraffin wax having a melting point of 66° to 70° C. and 38% by weight of zirconyl acetate, in amounts indicated in Table 4. The coating liquid was applied to an unbleached kraft paper having a weight of 50 g/m² in accordance with the same method as that used in Example 1. The coated paper was dried at a temperature of 105° C. for one minute by using a drying oven.

The properties of the resultant coated papers of Examples 16 through 20 are shown in Table 4.

Table 4

| Example No. | Composition (part by weight) | | Amount of coating (g/m²) | Water vapor permeability (g/m²/24hr) | Degree of defiberizing property (sec) | Degree of water resistance (class) |
| --- | --- | --- | --- | --- | --- | --- |
| 16 | MBR-latex (2) | 100 | 5.3 | 82 | 150 | 5 |
|    | Wax emulsion (3) | 7 | | | | |
| 17 | MBR-latex (2) | 100 | 4.9 | 73 | 150 | 5 |
|    | Wax emulsion (3) | 14 | | | | |
| 18 | MBR-latex (2) | 100 | 5.0 | 67 | 160 | 5 |
|    | Wax emulsion (3) | 21 | | | | |
| 19 | MBR-latex (2) | 100 | 4.9 | 65 | 160 | 5 |
|    | Wax emulsion (3) | 28 | | | | |
| 20 | MBR-latex (2) | 100 | 4.8 | 59 | 170 | 5 |
|    | Wax emulsion (3) | 35 | | | | |

Table 4 shows that the resultant papers of Example 16 through 20 had excellent water and moisture-proofing property and defiberizing property.

EXAMPLES 21 THROUGH 24 AND COMPARISON EXAMPLES 7 THROUGH 11

In each of Examples 21 through 24, a coating liquid was prepared by mixing 100 parts by weight of the MBR-latex (2) and 31 parts by weight of the wax emulsion (2), and then, applied in an amount indicated in Table 5 onto a surface of machine glazed kraft paper having a weight of 50 g/m². The coated paper was dried at a temperature indicated in Table 5 for one minute. The results of Examples 21 through 24 are indicated in Table 5.

In each of Comparison Examples 7 and 8, the same procedures as those used in Example 21 were carried out, except that the drying operation was carried out at a temperature shown in Table 5.

In each of Comparison Examples 9 through 11, a coating liquid was prepared from the wax emulsion (2) alone, and the coated paper was prepared in the same method as that used in Example 21, except that the drying operation was effected at a temperature as shown in Table 5.

The results of Comparison Examples 7 through 11 are indicated in Table 5.

Table 5

| Example No. | Drying temperature (°C) | Amount of coating (g/m²) | Water vapor permeability (g/m²/24hr) | Degree of defiberizing property (sec) | Degree of water resistance (class) |
| --- | --- | --- | --- | --- | --- |
| Comparison example | | | | | |
| 7 | Ambient temperature | 4.7 | 310 | 160 | 3 |
| 8 | 50 | 4.7 | 239 | 160 | 4 |
| Example | | | | | |
| 21 | 70 | 4.7 | 71 | 170 | 5 |
| 22 | 80 | 4.7 | 55 | 170 | 5 |
| 23 | 90 | 4.4 | 56 | 160 | 5 |
| 24 | 100 | 4.4 | 50 | 160 | 5 |
| Comparison example | | | | | |
| 9 | Ambient temperature | 4.4 | 150 | 200 | 2 |
| 10 | 50 | 4.4 | 169 | 210 | 2 |
| 11 | 70 | 4.4 | 2450 | 230 | 1 |

Table 5 clearly shows that the coating liquid of the present invention can provide an excellent moisture and water-proofing property and defiberizing property to the coated paper only when the coating liquid applied onto the paper substrate is dried at a temperature higher than the melting point of the wax contained in the coating liquid. Also, it should be noted that in Comparison Examples 9, 10 and 11, in which the coating liquid contained only the wax emulsion but no synthetic rubber latex, the higher the drying temperature, the lower the moisture and water-proofing property of the resultant paper. However, in Examples 21 through 24 and Comparison Examples 7 and 8, wherein the coating liquid contained both the wax emulsion and the synthetic rubber latex, the higher the drying temperature, the higher the moisture and water-proofing property of the present invention. Also, the defiberizing property of the coated papers of Examples 21 through 24 and Comparison Examples 7 and 8 is higher than that of Comparison Examples 9, 10 and 11.

From the above-mentioned comparisons, it is clear that the combination of the wax emulsion and the synthetic rubber latex of the present invention produces a special effect for enhancing the moisture and water-proofing property and the defiberizing property of the coated paper. This special effect can not be anticipated from the property and behavior of each of the wax emulsion and the synthetic rubber latex applied onto the paper substrate.

What we claim is:

1. A process for producing a moisture and waterproof repulpable paper, comprising coating at least one surface of a paper substrate with an aqueous emulsion containing (A) a butadiene-methyl methacrylate copolymer latex and (B) a wax emulsion in an amount of 5 to 200 parts by weight of the solid wax per 100 parts by weight of the solid copolymer and, then, drying said coated paper at an elevated temperature the same as or higher than the melting point of said wax to form a moisture and water-proof coating on said paper substrate surface.

2. A process as claimed in claim 1, wherein said aqueous emulsion has a total solid concentration of from 200 to 600 g/l.

3. A process as claimed in claim 1, wherein said moisture and water-proof coating is in an amount of 1 to 30 g/m².

4. A process as claimed in claim 1, wherein said butadiene-methyl methacrylate copolymer contains, as an additional component, at least one member of styrene and acrylonitrile.

5. A process as claimed in claim 1, wherein the amount of said butadiene in said butadiene-methyl methacrylate copolymer is in a range of from 25 to 75% by weight.

6. A process as claimed in claim 1, wherein said paper substrate is selected from kraft paper, fine paper, machine glazed paper and corrugated paper.

7. A process as claimed in claim 1, wherein said synthetic rubber contains at least one ethylenically unsaturated carboxylic acid copolymerized with said butadiene and said ethylenically unsaturated monomer.

8. A process as claimed in claim 1, wherein said synthetic rubber consists of 60 to 75% by weight of butadiene and 25 to 40% by weight of methylmethacrylate.

9. A process as claimed in claim 1, wherein said wax is selected from paraffin waxes and polyolefin waxes.

10. A process as claimed in claim 1, wherein said wax emulsion is an emulsion which has been prepared in such a manner that a mixture of 30 to 50% by weight of a solid paraffin wax having a melting point of from 40° to 60° C. and 50 to 70% by weight of a petroleum resin modified with maleic acid and having a softening point of from 50° to 100° C., is admixed with small amounts of rosin and at least one saturated or unsaturated higher aliphatic alcohol having 8 to 18 carbon atoms; the admixture is uniformly melted; the melt is emulsified with an aqueous solution of an organic amine or ammonia and; the emulsion is treated with an aqueous solution of an alkali metal hydroxide.

11. A process as claimed in claim 10, wherein the amounts of said rosin and said higher aliphatic alcohol are in a range of from 3 to 7% based on the sum of the weights of paraffin wax and modified petroleum resin, respectively.

12. A process as claimed in claim 10, wherein said higher aliphatic alcohol is selected from 2-ethylhexyl alcohol, octyl alcohol, decyl alcohol, dodecyl alcohol, mylistyl alcohol, cetyl alcohol, stearyl alcohol and oleic alcohol.

13. A process as claimed in claim 10, wherein the amount of said organic amine or ammonia is in a range of from 0.5 to 2% based on the weight of said melt.

14. A process as claimed in claim 10, wherein said alkali metal hydroxide is used in an amount of from 3 to 6% based on the weight of said melt.

15. A moisture and water-proof repulpable paper comprising a paper substrate and at least one moisture and waterproof coating formed on at least one surface of said paper substrate, said moisture and water-proof coating having been prepared by coating the surface of said paper substrate with an aqueous emulsion containing a butadiene-methyl methacrylate copolymer latex and a wax emulsion in an amount of 5 to 200 parts by weight of the solid wax per 100 parts by weight of the solid copolymer and, then, drying said coated paper at an elevated temperature the same as or higher than the melting point of said wax.

* * * * *